Patented Aug. 18, 1936

2,051,796

UNITED STATES PATENT OFFICE 2,051,796

HYDROGENATED RESIN ESTERS AND THEIR PRODUCTION

Irvin W. Humphrey, Wilmington, Del., assignor to Hercules Powder Company, Wilmington, Del., a corporation of Delaware No Drawing. Application December 2, 1929, Serial No. 411,201. Renewed September 22, 1932

35 Claims. (Cl. 260—99.40)

This invention relates to hydrogenated esters of resin acids, for example, of abietic acid, pimaric acid, the fossil rosin acids, etc., and more specifically relates to the hyrogenated polyhydric alcohol esters of these acids and their production.

Hydrogenated polyhydric alcohol esters of resin acids are found to have substantial advantages in the commercial arts over the generally known ester gums. These hydrogenated esters, for example, offer the advantage that, on exposure, coatings containing them retain their flexibility and original color for a longer period than corresponding coatings containing the non-hydrogenated polyhydric alcohol esters and at the same time they possess all of the advantageous features of the known ester gums.

The hydrogenated polyhydric alcohol esters in accordance with this invention may be produced by esterifying a hydrogenated resin acid, as for example, dihydro- or tetrahydro abietic or pimaric acid with a polyhydric alcohol, for example, propylene or ethylene glycol, diethylene glycol, trimethylene glycol, erythritol, arabitol, xylitol, pentaerythrite, mannitol, glycerol, etc. Alternatively a resin acid, as abietic acid, pimaric acid, etc., may be esterified with a polyhydric alcohol and the unsaturated ester subsequently hydrogenated, which is a preferable procedure.

While hydrogenation of the polyhydric alcohol esters is usually effected in the liquid phase, volatile rosin esters may be hydrogenated in the vapor phase.

As a further alternative, hydrogenation may be combined with esterification, as by heating the resin acid with a polyhydric alcohol at atmospheric or higher pressure, depending upon the boiling point of the alcohol, in the presence of a suitable catalyst, as platinum, nickel, palladium, etc., while treating with hydrogen.

As an illustration of the preparation of a hydrogenated ester by hydrogenating a polyhydric alcohol rosin ester, about 2% of catalytic nickel is added to the glycerol ester of abietic acid, prepared by esterifying rosin, as such, or abietic acid with, for example, glycerol, and the ester heated to a temperature of about 250° C. under atmospheric pressure for about 15 hours while passing into the ester a current of hydrogen. The time required for hydrogenation may be shortened to about two hours by carrying out the treatment at an increased pressure, say 200 pounds to the square inch. In this manner about 70% of the double bonds may be saturated with hydrogen. In effecting the hydrogenation, the ester may, of course, be subjected to treatment in solution in an alcohol, acetic acid, ethyl acetate, an ether or the like, under pressure.

A similar reaction may be carried out at room temperature using palladium as a catalyst. In this case the glycerol ester is dissolved in a suitable solvent, for example, ethyl acetate, rendered acid by the addition of a small proportion of acid, as acetic acid. To five parts of glycerol ester of rosin dissolved in ethyl acetate, one part of palladium may be added. The solution may then be shaken in an atmosphere of hydrogen, preferably under a pressure of say 40–60 pounds per square inch, at room temperature, or somewhat higher, until sufficient hydrogen is absorbed. Upon filtering off the catalyst and evaporating the solvent a hydrogenated glycerol ester results, about 90% hydrogenated.

In carrying out the hydrogenation of the polyhydric alcohol esters pressures may be used from atmospheric pressure up to around 2,000 pounds per square inch. Other catalysts may also be used, among which may be mentioned platinum, cobalt, nickel-copper, etc. The temperatures may vary depending upon the properties of the substances involved and the products formed, as well as the activity of the catalyst.

Instead of preparing a glycerol ester and then hydrogenating, the resin acid may be first hydrogenated and then esterified with the polyhydric alcohol. As an illustration of this process, either the hydrogenated resin or resin acid, as dihydro- or tetrahydro abietic acid is heated, if desired, under pressure in an autoclave, with a polyhydric alcohol, for example, glycerol or glycol either with or without an esterification catalyst such as boric anhydride. Alternatively an alkali salt of the hydrogenated acid may be treated with a halogen derivative of the alcohol, for example, a chlorohydrin such as glycolchlorhydrin or glycerol dichlorhydrin, etc.

It is also possible to effect the hydrogenation and esterification simultaneously, for example, by treating the polyhydric alcohol, the unsaturated resin acid, and a catalyst, such as nickel, palladium, or platinum, with hydrogen under pressure and at elevated temperatures.

The various alternative hydrogenation catalysts have already been referred to. The other conditions of the reaction depend upon the product desired, the reagents, etc., and may vary considerably. While specific examples involving glycerol, glycol, or their derivatives have been referred to above, it will be understood that strictly similar reactions occur using other less common polyhydric alcohols of the type noted above.

In the hydrogenation of an ester possessing two unsaturated bonds, for example, abietic esters, it is found that the ester absorbs hydrogen rather rapidly until about 1.2 double bonds of the two double bonds is saturated forming the dihydro-derivative; thereafter only a little more hydrogen may be absorbed under the usual conditions of hydrogenation. The formation of the tetrahydro-derivatives may be favored by using a solvent, or by hydrogenating for a longer period under pressure, or at higher temperature.

The hydrogenated polyhydric alcohol esters in accordance with this invention are admirably adapted as ingredients for coating compositions, as varnishes, lacquers and the like, in substitution for unsaturated resin esters and fossil resins, and in some cases are found valuable as plasticizers. Comparative tests show that films containing hydrogenated polyhydric esters of the resin acids do not become yellow or crack with aging as readily as do films containing non-hydrogenated esters. Hydrogenation of the glycerol ester, for example, is an improvement even if only 50% of the double bonds are saturated with hydrogen, but it is preferable to carry the hydrogenation as near to completion as practical, preferably at least to 75% saturation.

It will be understood that the esters in accordance with the invention may be produced from resin acids, as contained in resins, as rosin, fossil resins, etc., or from the resin acids as such, as abietic acid, pimaric acid, etc.

What I claim and desire to protect by Letters Patent is:

1. As a new product, a hydrogenated glycerol ester of a resin acid.

2. As a new product, hydrogenated glycerol abietate.

3. The method of preparing a hydrogenated polyhydric alcohol ester of abietic acid which includes forming the abietic ester and hydrogenating unsaturated bonds in abietyl groups of the ester.

4. The method of preparing a hydrogenated glycerol abietic acid ester which includes forming glycerol abietate and hydrogenating unsaturated bonds in abietyl groups of the ester.

5. The method of preparing a hydrogenated polyhydric alcohol ester of a resin acid which includes forming a resin acid ester of a polyhydric alcohol and hydrogenating the ester by heating it with hydrogen in the presence of a hydrogenation catalyst.

6. The method of preparing a hydrogenated polyhydric alcohol ester of abietic acid which includes forming an abietic ester of a polyhydric alcohol and hydrogenating the ester by heating it with hydrogen under pressure in the presence of a hydrogenation catalyst.

7. The method of preparing a hydrogenated polyhydric alcohol ester of abietic acid which includes forming an abietic ester of a polyhydric alcohol and hydrogenating unsaturated bonds in abietyl groups of the ester by heating it with hydrogen under pressure in the presence of a nickel hydrogenation catalyst.

8. The method of preparing a hydrogenated polyhydric alcohol ester of rosin which includes forming a rosin ester of a polyhydric alcohol and hydrogenating unsaturated bonds in acyl groups of the ester by heating it with hydrogen under pressure in the presence of a nickel hydrogenation catalyst.

9. The method of preparing a hydrogenated aliphatic polyhydric alcohol ester of abietic acid which includes forming an abietic ester of an aliphatic polyhydric alcohol and hydrogenating unsaturated bonds in abietyl groups of the ester by heating it with hydrogen under pressure in the presence of a nickel hydrogenation catalyst.

10. The method of preparing a hydrogenated aliphatic polyhydric alcohol ester of rosin which includes forming a rosin ester of an aliphatic polyhydric alcohol and hydrogenating unsaturated bonds in acyl groups of the ester by heating it with hydrogen under pressure in the presence of a nickel hydrogenation catalyst.

11. The method of preparing a hydrogenated glycol abietic acid ester which includes forming a glycol abietate and hydrogenating unsaturated bonds of the abietyl radical of the ester.

12. The method of preparing a hydrogenated aliphatic polyhydric alcohol ester of abietic acid which includes forming an abietic ester of a glycol and hydrogenating unsaturated bonds in abietyl groups of the ester by heating it with hydrogen under pressure within the range atmospheric—2000 pounds in the presence of a base metal hydrogenation catalyst.

13. The method of preparing a hydrogenated aliphatic polyhydric alcohol ester of rosin which includes forming a rosin ester of a glycol and hydrogenating unsaturated bonds in acyl groups of the ester by heating it with hydrogen under pressure within the range atmospheric—2000 pounds in the presence of a base metal hydrogenation catalyst.

14. The method of preparing a hydrogenated aliphatic polyhydric alcohol ester of rosin which includes forming a rosin ester of ethylene glycol and hydrogenating unsaturated bonds in acyl groups of the ester by heating it with hydrogen under pressure within the range atmospheric—2000 pounds in the presence of a nickel hydrogenation catalyst.

15. The method of preparing a hydrogenated aliphatic polyhydric alcohol ester of abietic acid which includes forming an abietic ester of an aliphatic polyhydric alcohol and hydrogenating unsaturated bonds in abietyl groups of the ester by heating it with hydrogen under pressure within the range atmospheric—2000 pounds in the presence of a base metal hydrogenation catalyst.

16. The method of preparing a hydrogenated aliphatic polyhydric alcohol ester of rosin which includes forming a rosin ester of an aliphatic polyhydric alcohol and hydrogenating unsaturated bonds in acyl groups of the ester by heating it with hydrogen under pressure within the range atmospheric—2000 pounds in the presence of a base metal catalyst.

17. The method of preparing a hydrogenated aliphatic polyhydric alcohol ester of rosin which includes forming a rosin ester of glycerol and hydrogenating unsaturated bonds in acyl groups of the ester by heating it with hydrogen under pressure in the presence of a base metal hydrogenation catalyst.

18. The method of preparing a hydrogenated aliphatic polyhydric alcohol ester of rosin which includes forming a rosin ester of glycerol and hydrogenating unsaturated bonds in acyl groups of the ester by heating it with hydrogen under pressure within the range atmospheric—2000 pounds in the presence of a base metal hydrogenation catalyst.

19. As a new product a polyhydric alcohol ester of abietic acid unsaturation of bonds in the abietyl groups of which have been reduced by hydrogenation.

20. As a new product a polyhydric alcohol ester of rosin unsaturation of bonds in the acyl groups of which have been reduced by hydrogenation.

21. As a new product a glycol ester of abietic acid unsaturation of bonds in the abietyl groups of which have been reduced by hydrogenation.

22. The method of preparing a hydrogenated aliphatic polyhydric alcohol ester of abietic acid which includes forming an abietic ester of glycerol and hydrogenating unsaturated bonds in abietyl groups of the ester by heating it with hydrogen under pressure within the range atmospheric—2000 pounds in the presence of a platinum hydrogenation catalyst.

23. As a new product a rosin acid ester of an aliphatic polyhydric alcohol unsaturation of bonds in the acyl groups of which have been reduced by hydrogenation.

24. As a new product a rosin acid ester of glycerol unsaturation of bonds in the acyl groups of which have been reduced by hydrogenation.

25. As a new product a resin acid ester of a polyhydric alcohol unsaturation of bonds in the acyl groups of which have been reduced by hydrogenation.

26. The method of preparing a hydrogenated resin acid ester of a glycol, which includes forming a glycol resin ester and reducing the unsaturation of bonds in the acyl groups with hydrogen.

27. The method of preparing a hydrogenated resin acid ester of a polyhydric aliphatic alcohol, which includes forming a resin acid ester of a polyhydric aliphatic alcohol and hydrogenating unsaturated bonds in the acyl groups of said ester.

28. The method of preparing a hydrogenated polyhydric aliphatic alcohol ester of rosin which includes forming a rosin ester and hydrogenating unsaturated bonds in the acyl groups of said ester.

29. The method of preparing a hydrogenated glycerol resin acid ester which includes forming a glycerol resin acid ester and hydrogenating unsaturated bonds in the acyl groups of said ester.

30. The method of preparing a hydrogenated resin acid ester of a polyhydric aliphatic alcohol which includes forming a resin acid ester of a polyhydric aliphatic alcohol and hydrogenating unsaturated bonds in the acyl radical in the presence of a noble metal hydrogenation catalyst.

31. The method of preparing a hydrogenated resin acid ester of ethylene glycol, which includes forming an ethylene glycol resin ester and reducing the unsaturation of bonds in the acyl groups with hydrogen.

32. The method of preparing a hydrogenated glycol abietic acid ester which includes forming ethylene glycol abietate and hydrogenating unsaturated bonds of the abietyl radical of the ester.

33. As a new product an ethylene glycol ester of abietic acid unsaturation of bonds in the abietyl groups of which have been reduced by hydrogenation.

34. As a new product a pimaric acid ester of an aliphatic polyhydric alcohol unsaturation of bonds in the acyl groups of which is reduced by hydrogen.

35. As a new product a resin acid ester of an aliphatic polyhydric alcohol, the ester having a hydrogen saturation of about 50%–75%.

IRVIN W. HUMPHREY.